(12) United States Patent
Simonnot

(10) Patent No.: US 9,676,454 B2
(45) Date of Patent: Jun. 13, 2017

(54) DEFLECTOR FOR MARINE SEISMIC SURVEY SYSTEM

(71) Applicant: CGG SERVICES SA, Massy (FR)

(72) Inventor: Frédéric Simonnot, Paris (FR)

(73) Assignee: CGG SERVICES SAS, Massy (FR)

( * ) Notice: Subject to any disclaimer, the term of this patent is extended or adjusted under 35 U.S.C. 154(b) by 366 days.

(21) Appl. No.: 14/194,842

(22) Filed: Mar. 3, 2014

(65) Prior Publication Data

US 2014/0247692 A1 Sep. 4, 2014

Related U.S. Application Data

(60) Provisional application No. 61/772,243, filed on Mar. 4, 2013.

(51) Int. Cl.
*B63B 21/66* (2006.01)
*G01V 1/38* (2006.01)

(52) U.S. Cl.
CPC ............ *B63B 21/66* (2013.01); *G01V 1/3826* (2013.01)

(58) Field of Classification Search
CPC ........ B63B 21/66; B63B 21/56; G01V 1/3826
See application file for complete search history.

(56) References Cited

U.S. PATENT DOCUMENTS

| | | | | |
|---|---|---|---|---|
| 3,434,446 A * | 3/1969 | Cole | ....................... | B63B 21/66 114/245 |
| 3,645,224 A * | 2/1972 | Haberman | .............. | B63B 21/66 114/245 |
| 5,142,497 A * | 8/1992 | Warrow | ............... | G10K 11/006 367/12 |
| 5,265,066 A * | 11/1993 | Svenning | ............. | G01V 1/3808 367/154 |
| 5,357,892 A * | 10/1994 | Vatne | .................... | A01K 73/045 114/244 |
| 5,386,793 A * | 2/1995 | Gaudiano | ................ | B63G 7/02 114/253 |
| 5,443,027 A * | 8/1995 | Owsley | ................... | B63B 21/66 114/244 |
| 6,498,768 B1 * | 12/2002 | Gjestrum | ............... | G01V 1/201 367/16 |
| 7,621,229 B2 * | 11/2009 | Bowen | ................... | B63G 8/001 114/244 |
| 8,902,696 B2 * | 12/2014 | Toennessen | ............ | B63B 21/66 114/244 |

(Continued)

OTHER PUBLICATIONS

Extended European Search Report in corresponding European Application No. EP 14 15 7601 dated Jan. 23, 2017. (Ref. US2010/149910 was cited by the Examiner in an Office Action dated Jan. 22, 2016.).

*Primary Examiner* — Ian J Lobo
(74) *Attorney, Agent, or Firm* — Patent Portfolio Builders PLLC

(57) ABSTRACT

A deflector is configured to be attached to a cable towed by a vessel. The deflector includes a foil configured to provide a lift force; first and second bulbs attached to opposite ends of the foil; and a joint attached to the foil and configured to receive the cable. The first and second bulbs are offset by a predetermined distance from a plane that extends through the foil, and at least one of the first and second bulbs has a longitudinal axis that makes an angle (θ) with a cord of the foil, the cord extending in the plane.

18 Claims, 10 Drawing Sheets

(56) References Cited

U.S. PATENT DOCUMENTS

| | | | |
|---|---|---|---|
| 9,221,524 B2* | 12/2015 | Richer De Forges | B63B 21/663 |
| 2003/0039170 A1 | 2/2003 | Soreau et al. | |
| 2003/0226488 A1 | 12/2003 | Grieger et al. | |
| 2005/0016434 A1* | 1/2005 | Hocquet | G01V 1/3826 114/250 |
| 2006/0227657 A1* | 10/2006 | Tveide | B63B 21/56 367/16 |
| 2006/0227658 A1* | 10/2006 | Toennessen | G01V 1/3861 367/18 |
| 2007/0095270 A1* | 5/2007 | Kristiansen | B63B 21/663 114/244 |
| 2008/0205192 A1* | 8/2008 | Keskes | B63B 21/663 367/17 |
| 2009/0092004 A1 | 4/2009 | Toennessen | |
| 2009/0316526 A1* | 12/2009 | Grall | G01V 1/3826 367/20 |
| 2010/0149910 A1* | 6/2010 | Martin | G01V 1/3826 367/17 |
| 2013/0239864 A1* | 9/2013 | Richer De Forges | B63B 21/663 114/253 |

* cited by examiner

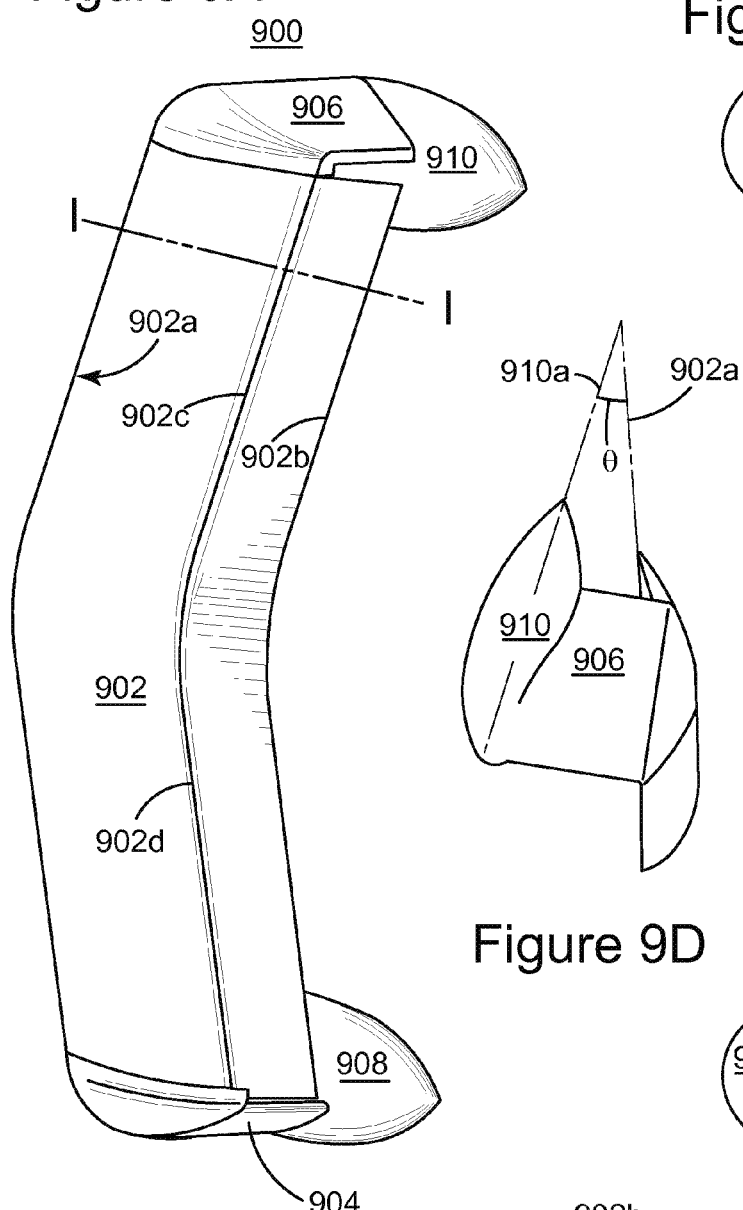
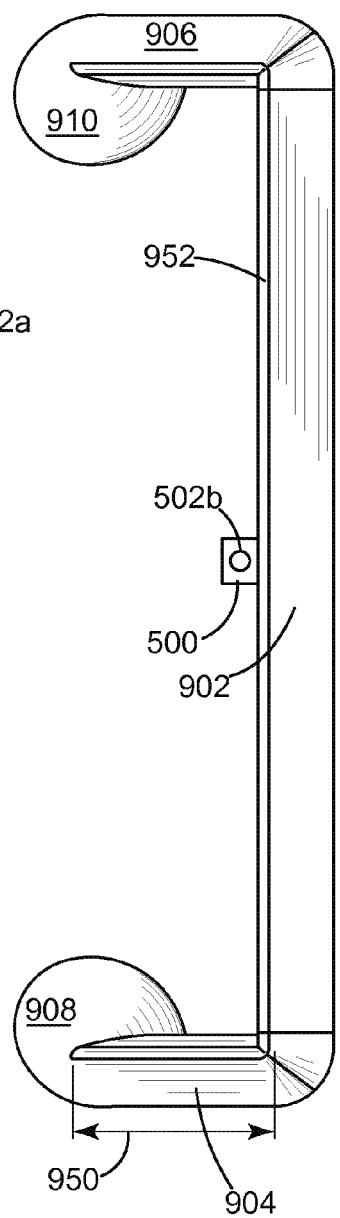
Figure 9A
Figure 9B
Figure 9C
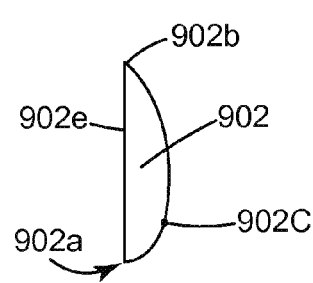
Figure 9D

DEFLECTOR FOR MARINE SEISMIC SURVEY SYSTEM

BACKGROUND

1. Technical Field

Embodiments of the subject matter disclosed herein generally relate to devices and systems used in marine exploration and, more particularly, to deflectors for controlling seismic source and/or seismic receivers positioning.

2. Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of geophysical structures under the seafloor is an ongoing process.

Reflection seismology is a method of geophysical exploration to determine the properties of earth's subsurface, which is especially helpful in determining the above-noted reservoirs. Marine reflection seismology is based on using a controlled source of energy that sends the energy into the earth. By measuring the time it takes for the reflections and/or refractions to come back to plural receivers, it is possible to evaluate the depth of features causing such reflections. These features may be associated with subterranean hydrocarbon deposits.

A traditional system for generating seismic waves and recording their reflections off geological structures present in the subsurface is now illustrated in FIG. 1. System 100 includes a vessel 102 that tows two source arrays 110a and 110b (it is also possible to tow only one source or more than two sources but, for simplicity, the novel features are discussed with regard to two source arrays) and plural streamers 120. Streamers 120 are connected to the vessel through lead-ins 122, while source arrays 110a and 110b are connected to the vessel through dedicated cables 112. Each source array 110a or 110b may include sub-arrays 114, each sub-array having plural individual source elements 116. Deflectors 140 are provided on the sides of this arrangement to maintain a transverse distance (relative to the path of the vessel) between streamers 120. Deflectors 140 are connected to vessel 100 via wide tow cables 142, and spread ropes or cables 144 are used to separate the streamers from each other. Note that the terms "rope," "cable" and "wire" are used sometimes interchangeably in this document. Thus, these terms should not be construed in a narrow sense, but rather as those skilled in the art would expect. The number of streamers or individual source elements is exemplary and not intended to limit the applicability of the novel concepts.

A single sub-array 114 is shown in FIG. 2. Sub-array 114 includes one or more floats 160 from which individual source elements 116 are suspended with cables, chains or ropes 162. In one application, clusters of individual source elements are provided at location 116. Various cables and hoses connect individual source elements 116 to the vessel for providing electric power, compressed air, data transmission, etc. For example, a hose 164 provides compressed air and a cable 166 provides electric power and/or data transmission.

Source bases 118 are connected to each other via links 170 and also to a bell housing 180 via a connection 182. In one application, links 170, bell housing 180 and connection 182 may form an enclosure in which the various cables 164 and 166 are entering. Bell housing 180 may be made of a resistant material, for example, stainless steel. A bend restrictor device 190 may be connected to the bell housing 180 and also to vessel 100 via an umbilical 192. Bend restrictor device 190 is configured to prevent an over-bending of the front part of the source array due to the towing force applied via umbilical 192. Bend restrictor device 190 may also be made of a resistant material. In one application, bell housing 180 may be directly connected to umbilical 192.

Returning to FIG. 1, to prevent the sub-arrays from moving along a cross-line direction Y, various cables 170 and 180 may be used to anchor the sub-arrays to lead-ins 122. However, these cables are not enough for maintaining equal separation of the sub-arrays from each other and also from the lead-ins. FIG. 3 shows a situation in which cables 170 and 180 are slack because of various underwater currents (not shown) that move the sub-arrays. For this reason, winches 172 (see FIG. 1) may be added to adjust the length of cables 170 as desired, to avoid the slacking.

However, even with such winches, if the water currents are strong and/or non-symmetrical, various sub-array separation problems may still appear as illustrated in FIG. 4. The configuration of FIG. 4 shows water currents 192 acting on vessel 102, which changes its orientation relative to the intended path 190, and also acting on sub-arrays 110a and 110b. Hydrodynamic forces 194 on the port side of the source may be stronger than the same forces 196 on the starboard side. For this reason and because of the misalignment of the sub-arrays, the separation between sub-arrays starts to deviate from preset values, i.e., separation 198 on port becomes too wide and separation 199 on starboard becomes to small (the array 110b collapses). This alteration of source array geometry is reflected in the recorded traces and degrades the overall quality of the image of the surveyed subsurface. Deflectors 182 may be attached to the umbilical of each sub-array to stabilize the sources, but the existing deflectors have their own limitations (e.g., instability) and are only partially successful in reaching this goal.

Thus, there is a need to develop a better deflector for preventing the above-noted problems.

SUMMARY

According to an embodiment, there is a deflector configured to be attached to a cable towed by a vessel. The deflector includes a foil configured to provide a lift force; first and second bulbs attached to opposite ends of the foil; and a joint attached to the foil and configured to receive the cable. The first and second bulbs are offset by a predetermined distance from a plane that extends through the foil, and at least one of the first and second bulbs has a longitudinal axis that makes an angle ($\theta$) with a cord of the foil, the cord extending in the plane.

According to another embodiment, there is a joint configured to be attached to a deflector for seismic marine exploration. The joint includes an inside part configured to be fixedly attached to a cable; and an outside part having a cavity configured to house the inside part, the outside part being also configured to rotate relative to the inside part. The inside part has a groove and the outside part has a cam that fits into the groove and moves along the groove.

According to still another embodiment, there is a seismic survey system for collecting seismic data. The system includes a vessel; plural seismic source arrays towed by the vessel and configured to generate seismic waves; and at least one deflector attached to a corresponding sub-array of a seismic source array and configured to maintain a separation distance between the sub-array and an adjacent sub-array.

The at least one deflector includes a foil configured to provide a lift force, first and second bulbs attached to opposite ends of the foil, and a joint attached to the foil and configured to be attached to a cable connected to the sub-array. The joint includes an inside part configured to be fixedly attached to the cable, and an outside part having a cavity configured to house the inside part. The inside part has a groove and the outside part has a cam that fits into the groove and moves along the groove.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 9A-D are schematic diagrams of a deflector according to an embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a deflector attached to the umbilical connecting a sub-array to a vessel. However, the embodiments to be discussed next are not limited to a marine seismic survey system, but may be applied to other situations in which cables are towed underwater. For example, the deflector may be installed on the inner streamers to pull them towards the inside. In another embodiment, the deflectors may be attached to the streamers to pull them in an opposite direction.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a new deflector is introduced and can be attached to a source, streamer or cable used in the marine seismic survey. The novel deflector has better stability due to a new configuration of the center of gravity, center of buoyancy and other points where drag and lift forces are applied. The novel deflector also exhibits increased lift and reduced drag. The novel deflector has not only a new shape, but also a new joint for being attached to the umbilical. These aspects are discussed in more detail with regard to the following exemplary embodiments.

Figure 1:
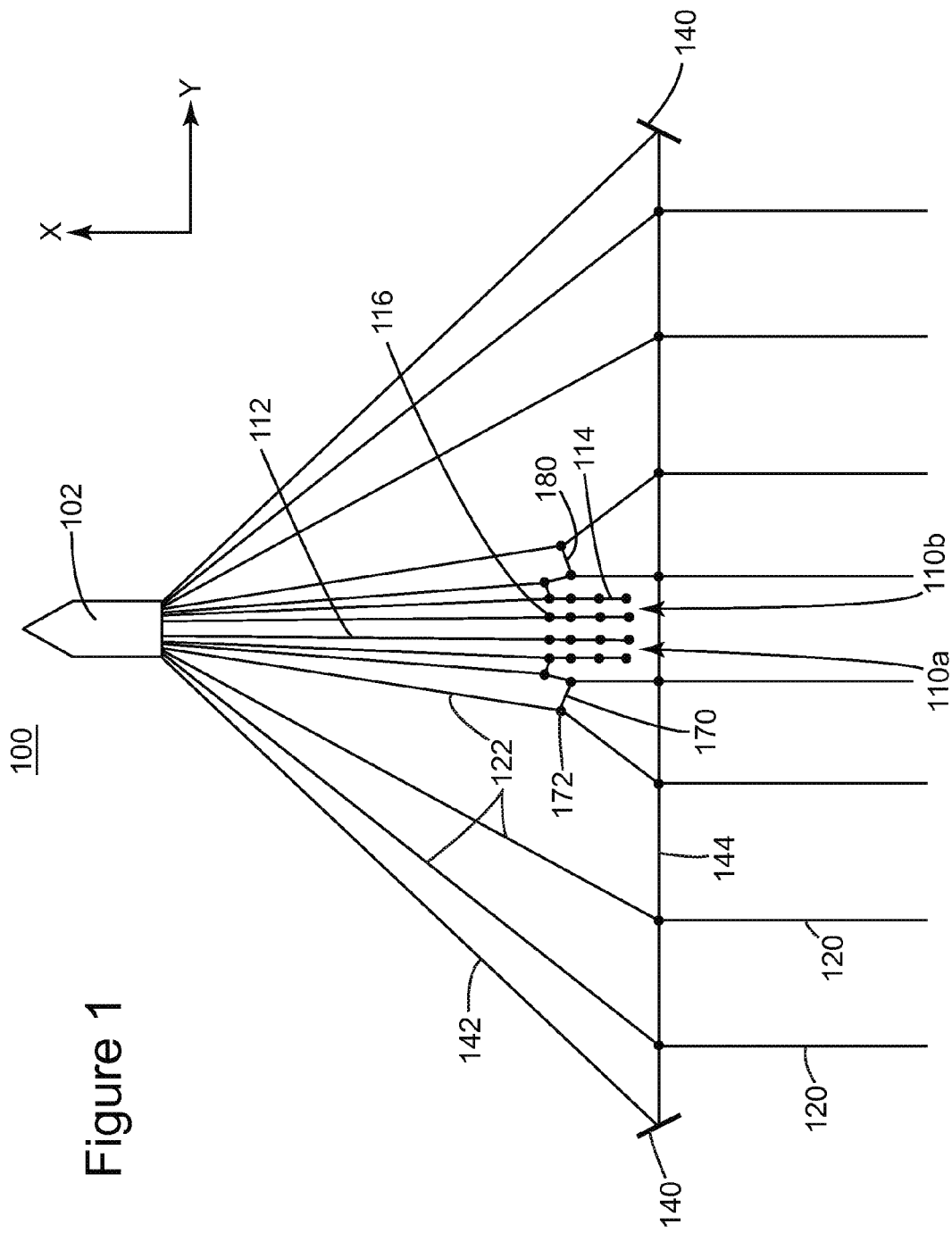
FIG. 1 is a schematic diagram of a marine survey system.
Figure 2:
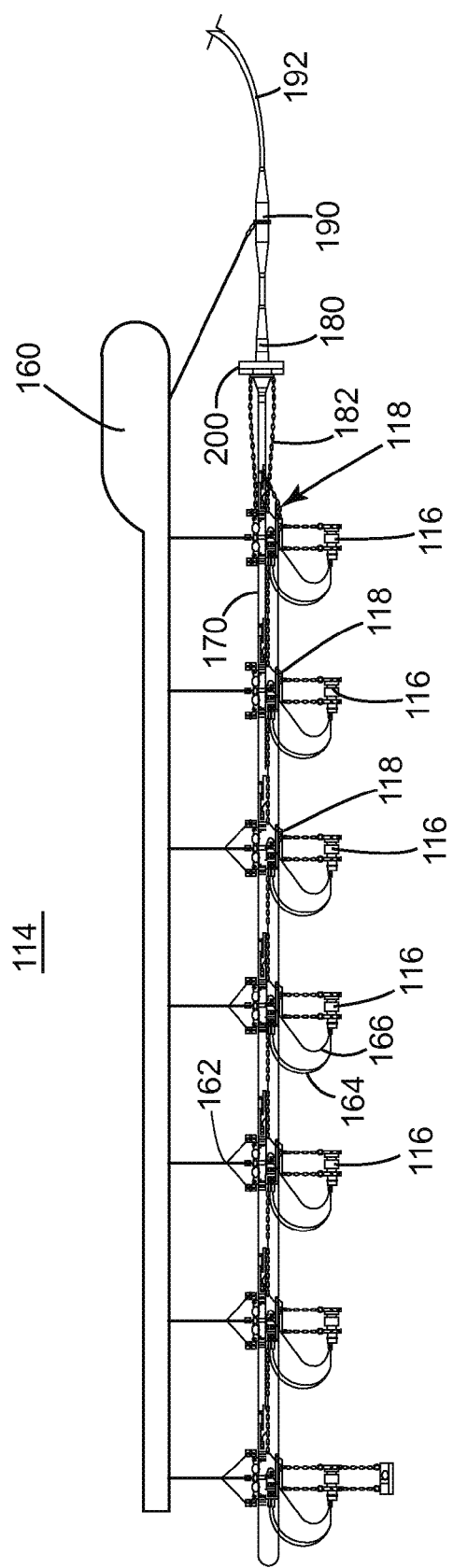
FIG. 2 is a schematic diagram of a seismic sub-array.
Figure 3:
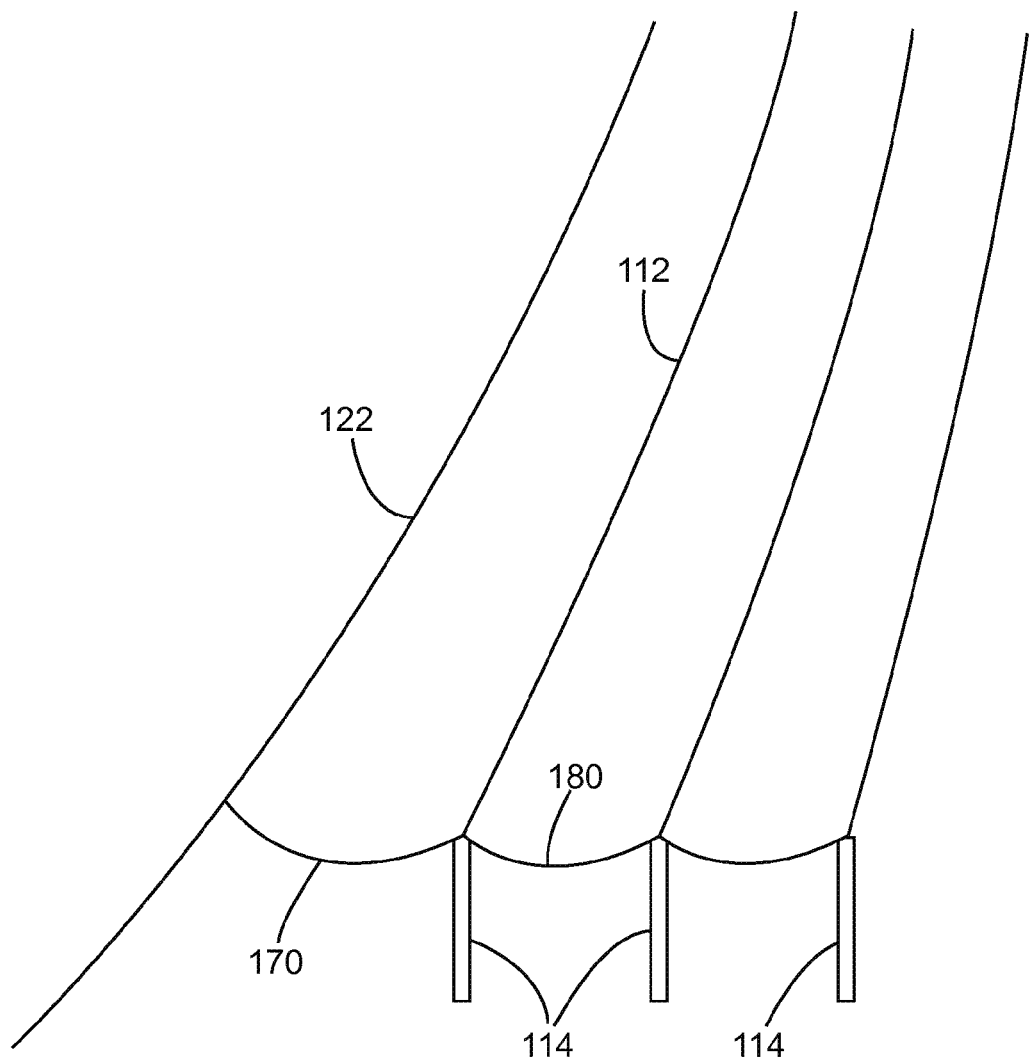
FIG. 3 is a schematic diagram illustrating spur line slacking.
Figure 4:
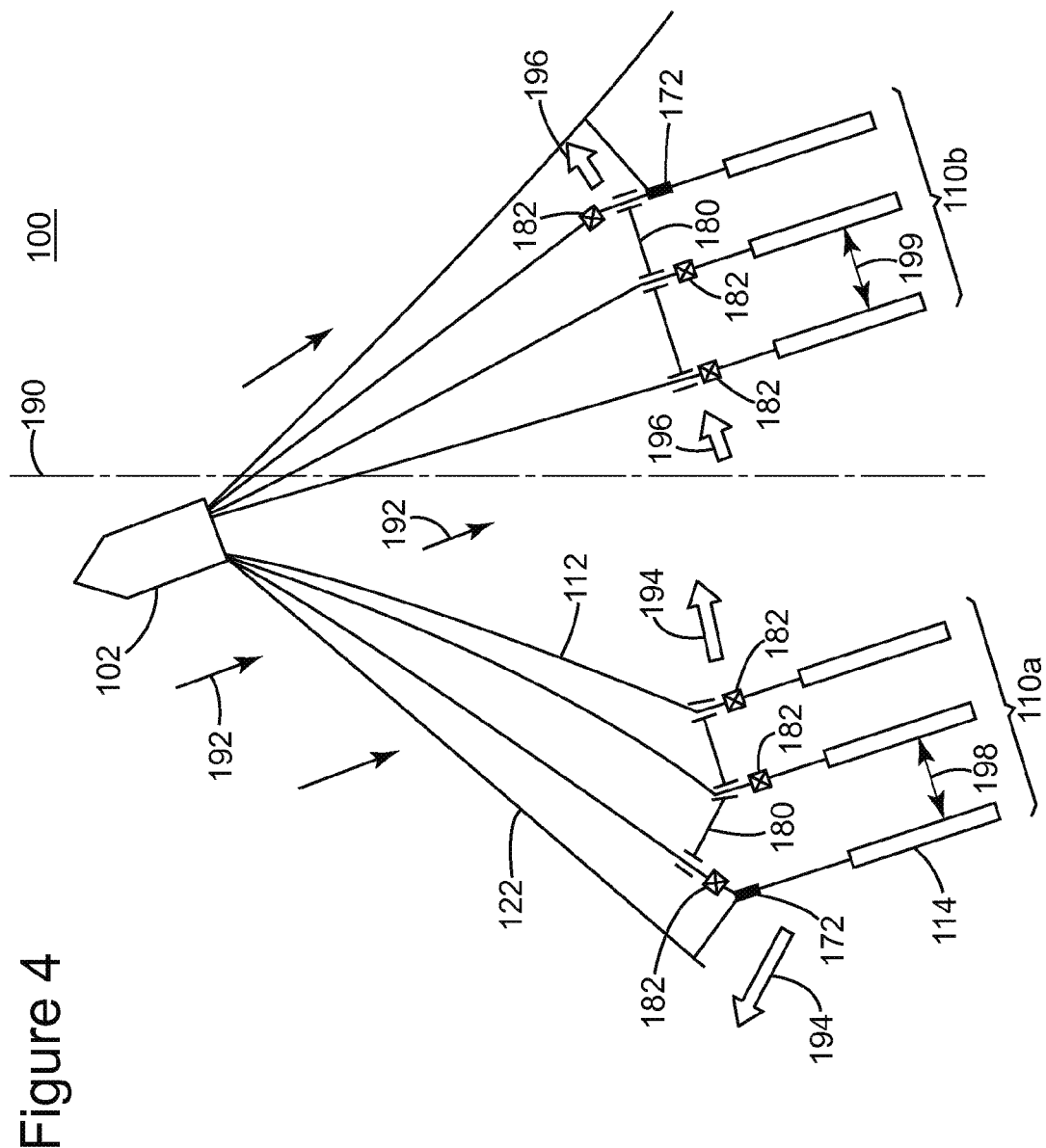
FIG. 4 is a schematic diagram of a seismic survey system having irregularly positioned sub-arrays due to strong currents.
Figure 5:
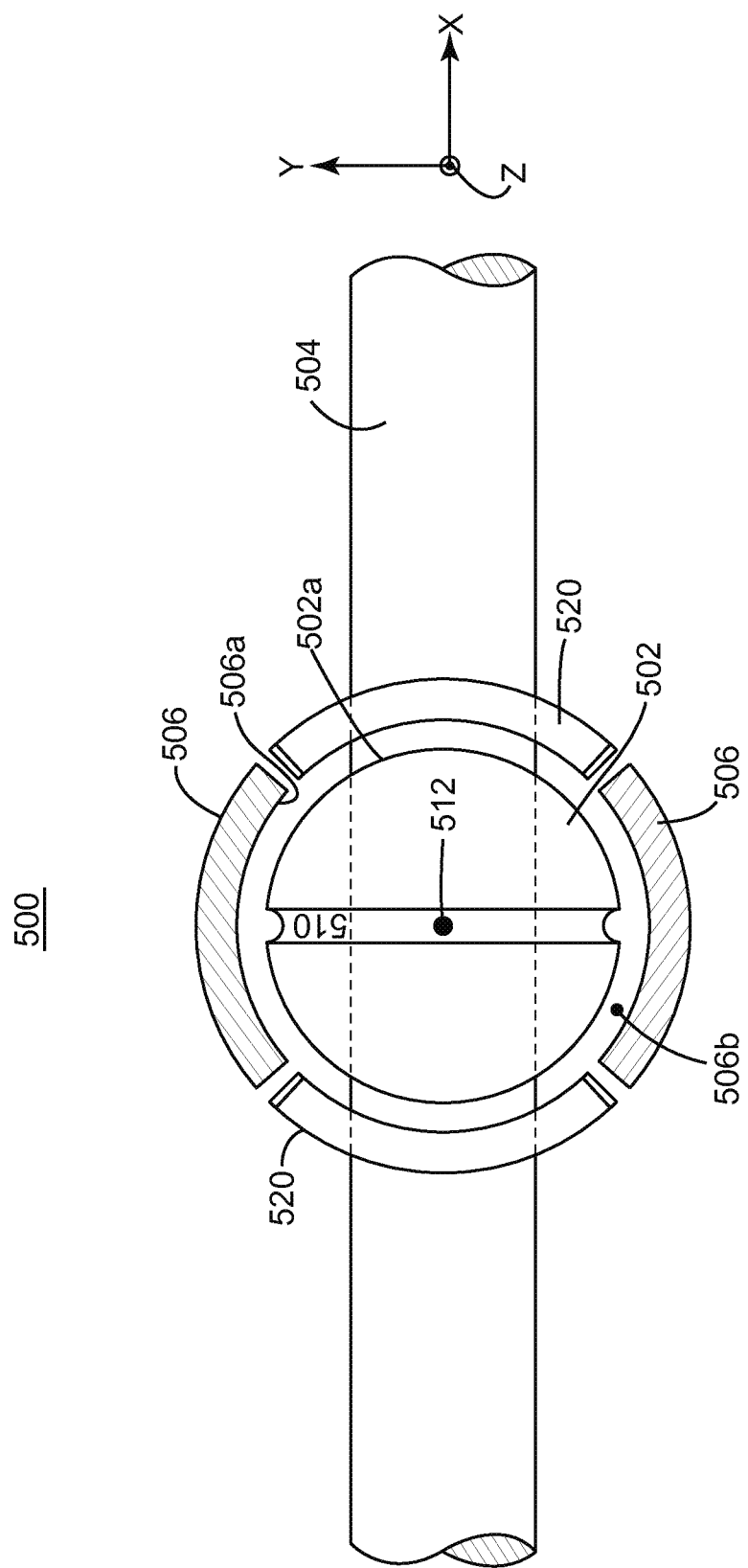
FIG. 5 is a schematic diagram of a joint that connects a deflector to a cable according to an embodiment.

Regarding the new joint, FIG. 5 illustrates it as being attached to an umbilical. The new joint 500 has an internal part 502 that may be fixedly attached to the umbilical 504, and also an external part 506 configured to rotate relative to internal part 502. FIG. 5 shows a cross-section of the two parts. Parts 502 and 506 may have various shapes. This embodiment illustrates internal part 502 having an external surface 502a being curved (e.g., spherical) while external part 506 has an internal surface 506a that is also curved to match external surface 502a. In one application, both internal and external parts have cylindrical mating surfaces. Internal surface 506a forms a cavity 506b that is configured to house internal part 502. In one application, internal surface 506a mirrors external surface 502a.

A movement of external part 506 relative to internal part 502 is now described. According to this embodiment, external part 506 has two degrees of freedom, i.e., it can rotate around two perpendicular axes but not around a third one. Considering that axis X is along umbilical 504, axis Y is perpendicular to the umbilical, and axis Z is perpendicular on both X and Y (i.e., Z is perpendicular on the page), external part 506 is configured to freely rotate around axis X, i.e., around the umbilical. In one application, this is achieved by making a groove 510 into external surface 502a of internal part 502. Groove 510 extends all the way around external surface 502a, i.e., extends along the entire circumference of external surface 502a. In another application, the groove may partially extend around the external surface to limit the rotation of the external part around axis X.

Figure 6:
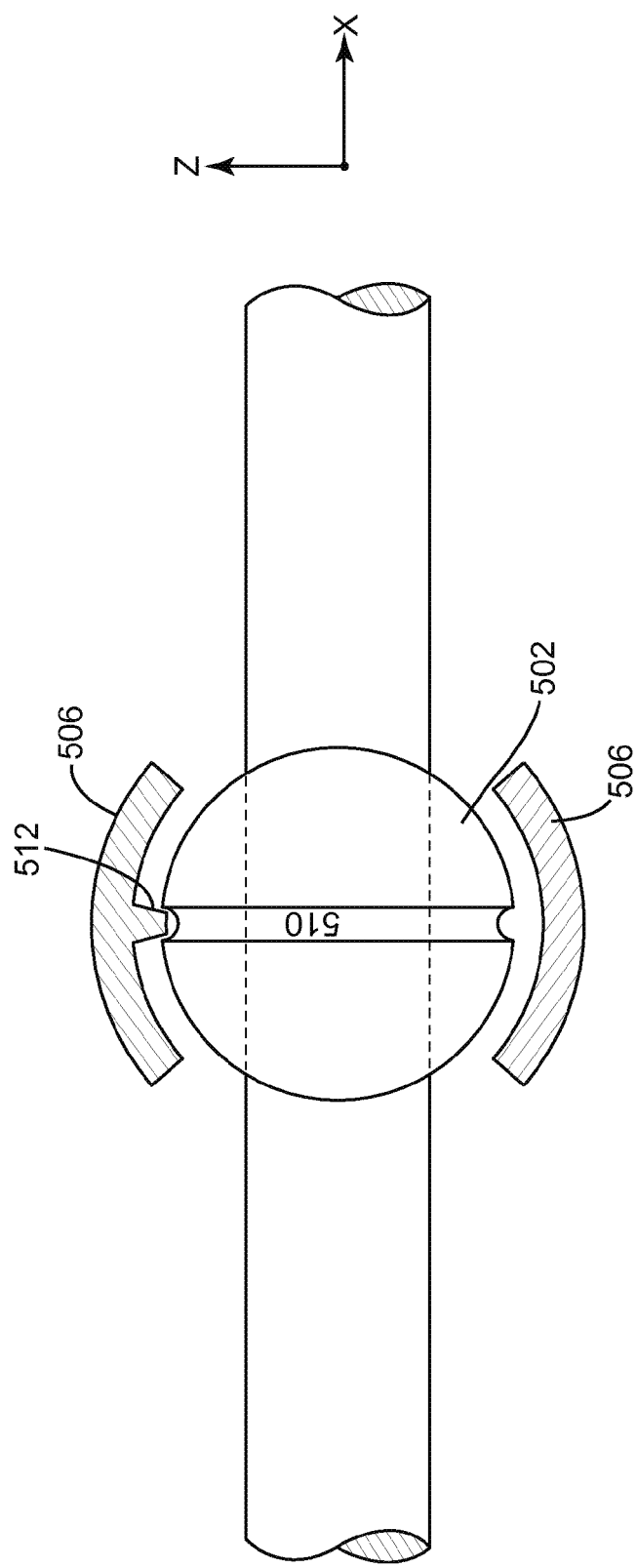
FIG. 6 is another schematic diagram of a joint that connects a deflector to a cable according to an embodiment.

To achieve free rotation around axis X, external part 506 has a cam 512 formed on its internal surface 506a, and the cam travels through groove 510. FIG. 6 illustrates the relative positions of cam 512 and groove 510 in a transversal cross-section in plane XZ. In one application, external part 506 may have more than one cam inside groove 510.

External part 506 also has a degree of freedom (rotation) around axis Z, i.e., around the axis of the cam 512 in FIG. 5. Rotation around this axis may be limited to a predetermined angle (e.g., 20 degrees). This limitation is achieved by using, for example, stoppers 520 located on both sides of internal part 502. Stoppers 520 may be fixed to the umbilical, thus limiting not only a rotational motion of external part 506 around axis Z, but also a translational motion of internal part 502 relative to umbilical 504. In one application, external part 506 cannot rotate relative to axis Y, i.e., it is fixed relative to this axis. However, it is possible to fix this rotation at a dedicated angle that will depend of the needs of the survey. For example, this angle may correspond to the wing angle of attack. Thus, by fixing this angle to a desired angle, it is possible to change the lift generated by the deflector.

Figure 8:
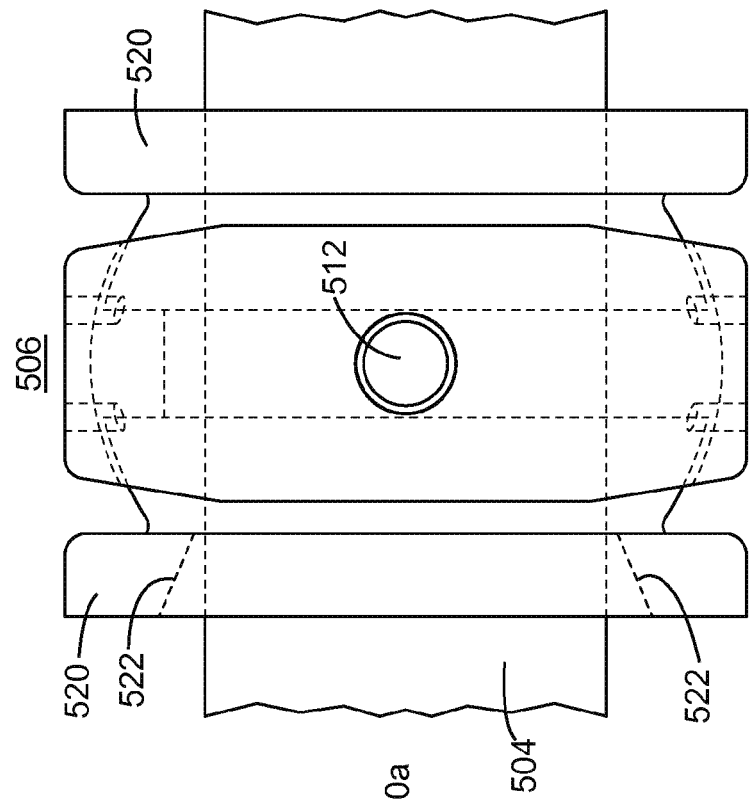
FIG. 8 is an overview of a joint that connects a deflector to a cable according to an embodiment.
Figure 7:
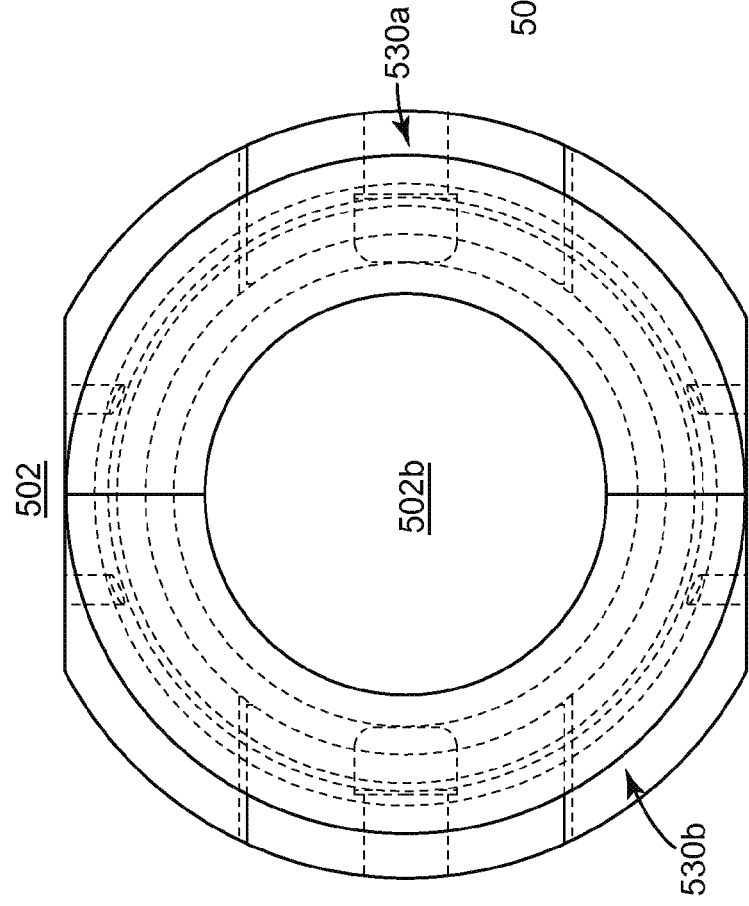
FIG. 7 is a cross-sectional view of a joint that connects a deflector to a cable according to an embodiment.

FIG. 7 shows another view of internal part 502 and FIG. 8 shows external part 506 and its cam 512. Internal part 502 has a bore 502b that fits over the umbilical 504. In one application, internal part 502 is formed of two halves 530a and 530b, as shown in FIG. 7, and the two halves are attached to each other, for example, with screws. Stoppers 520 shown in FIG. 5 may be part of external part 506 as shown in FIG. 8. In this application, stoppers 520 may have a bore 522 larger than the external diameter of umbilical 504, and this bore acts as a stopper when external part 506 rotates around the longitudinal axis (Z axis) of cam 512 in FIG. 8. In another application, internal part 502 may be cylindrical, and then internal surface 506a of external part 506 is cylindrical. In this application, the contact surface between the internal and external parts is larger, thus, better withstanding stress.

Figure 10:
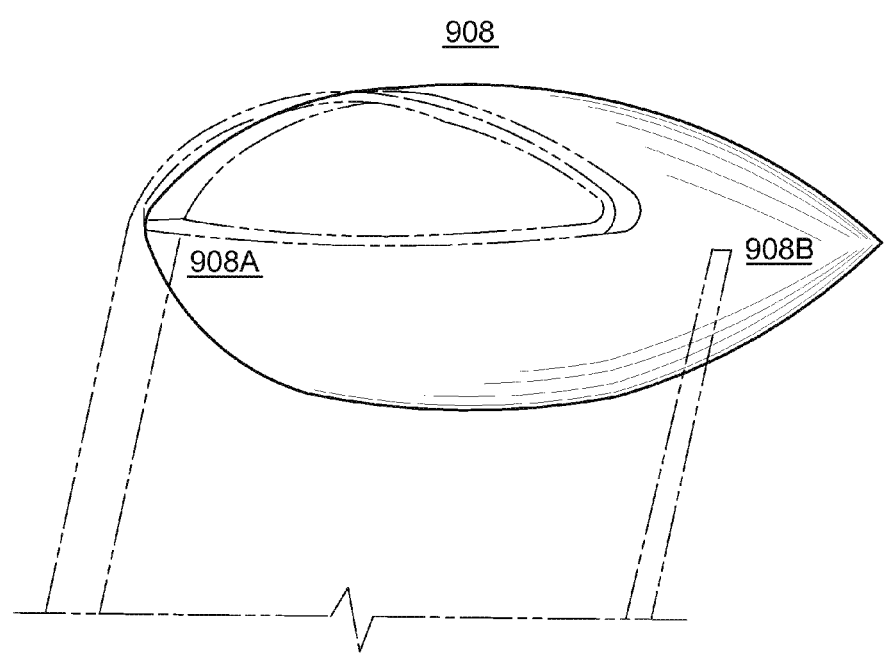
FIG. 10 is a schematic diagram of a bulb to be attached to a deflector according to an embodiment.

A shape of the deflector is now discussed with regard to FIGS. 9A to 10. FIG. 9A is an overall view of a deflector 900 that has a central foil 902, two attachment parts 904 and 906 and two bulbs 908 and 910. The attachment parts offset the bulbs from the foil. FIG. 9A also shows a leading edge 902a and a trailing edge 902b of foil 902. Both edges may form a V shape as illustrated in the figure. Edges 902c and 902d may form a predefined angle, e.g., larger than 90 degrees. FIG. 9B shows a cross-sectional view along line I-I in FIG. 9A of foil 902. A cord 902e may be a straight line while the opposite surfaces may be curved, and forming the edge 902c. FIG. 9C shows a frontal view of the same deflector, and FIG. 9D shows the position of the bulbs relative to the foil. FIG. 9C also shows joint 500 being attached to foil 902. Bore 502b is configured to be attached to the umbilical (not shown). In this embodiment, joint 500 is attached on the same side of the foil as bulbs 908 and 910. Further, FIG. 9C shows that bulbs 908 and 910 are offset by a predetermined distance 950 from a plane 952 that extends through foil 902. Plane 952 may be, for example, inside the body of foil 902 or it may be an inside face of the foil. In one application, both bulbs are offset by the same distance 950 from plane 952. If the bulbs are positioned as illustrated in FIG. 9D, the distance 950 may be measured from the center of the bulb to the plane 952.

Regarding the relative position of the bulbs, FIG. 9D shows a longitudinal axis 910A of bulb 910 making an angle θ with cord 902e of foil 902. Note that cord 902e may extend in the plane 952. In one application, bulb 908 has the same configuration as bulb 910. In one application, angle θ is about 5 degrees. This angle improves the stability of the deflector because the bulbs better respond to the tendency of the foil to turn about the same angle in comparison to the direction of the bulbs. Also, it may reduce the drag of the deflector, as the bulb is more in line with the flow. The horizontal attachment part 906 of deflector 900, between the bulb 910 and the foil 902, is configured to act as a stabilizer to limit the movement of the deflector around the Y axis. These horizontal parts 906 and/or 908 (bottom and top) act like an airplane's tail. Note that there is a distance along the X axis (seen in FIG. 11B), between the deflector's center of rotation and the attachment parts and this distance increases the overall stability of the deflector.

Bulbs 908 and 910 may be identical, and they may have the shape shown in FIG. 10 or another shape. The shape shown in FIG. 10 has a round end 908A and a pointed end 908B. In one application, the round ends are next to the trailing edge 902a. In one application, the bulbs have different weights, e.g., the top bulb being lighter than the bottom bulb.

An observed improved ratio of lift to drag and/or stability (i.e., better lift and less drag) of the novel deflector is due to one or more of the following factors: the ball joint novel design and the deflector's shape novel design. The deflector's shape novel design was illustrated in FIGS. 9A to 10.

Figure 11B:
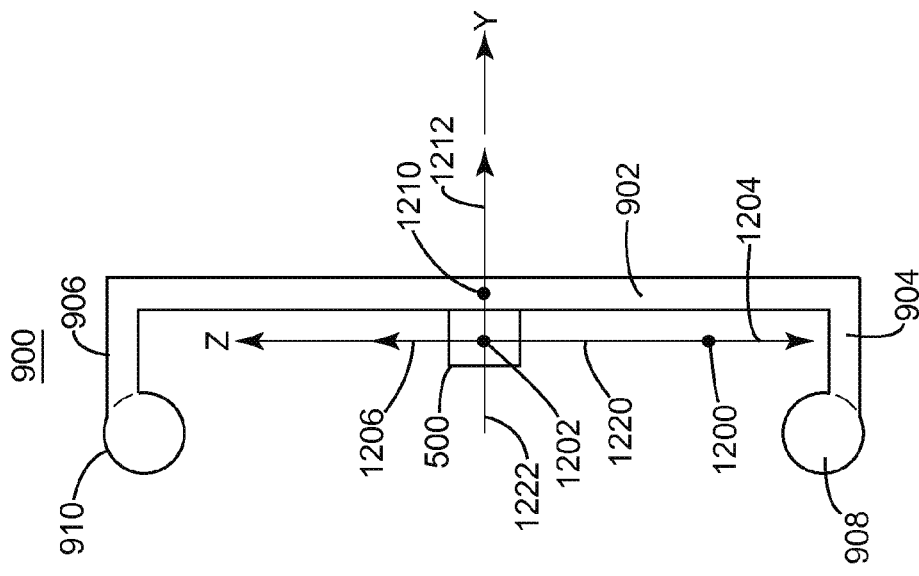
FIGS. 11A and 11B are schematic diagrams illustrating various forces applied to a deflector according to an embodiment.
Figure 11A:
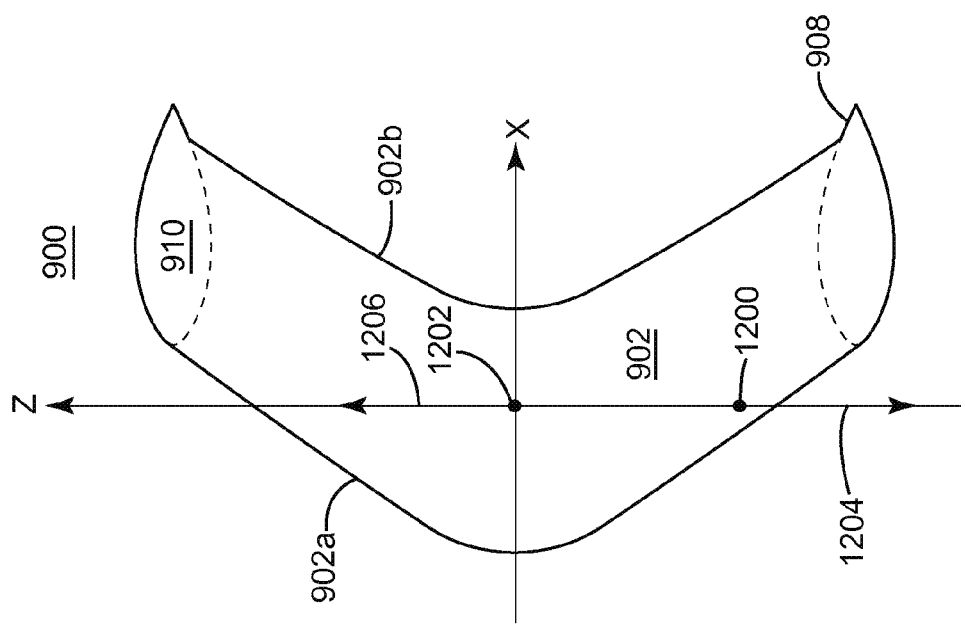

FIGS. 11A-B show the implications, in terms of force distribution, of this novel design on the deflector's stability. More specifically, FIG. 11A is a side view of deflector 900 and shows foil 902 extending in plane ZX. Note that foil 902 does not have to be planar; it may have a 3D profile. The masses of bulbs 908 and 910 are calculated in such a way that the center of mass (or center of gravity) 1200 is located below the center of buoyancy 1202. Thus, the force of gravity 1204 and the buoyancy force 1206 form a torque, when the deflector deviates from its equilibrium position, that brings the deflector back to its equilibrium position.

Further, as shown in FIG. 11B, which is a front view of the deflector, center of gravity 1200 is in fact outside the body of the deflector, while center of buoyancy 1202 is located inside joint 500, still outside the deflector's body. FIG. 11B also shows the center 1210 of hydrodynamic forces 1212, i.e., forces that act on the deflector due to the interaction with water, e.g., drag. Considering that the deflector's position in both FIGS. 11A and 11B is an equilibrium position, in one application, the center of buoyancy and the center of gravity are located on a first line 1220, and the center of buoyancy and the center of hydrodynamic forces are located on a second line 1222, and the second line is substantially perpendicular on the first line. Note that the center of hydrodynamic forces is located inside foil 902. In one application, joint 500 is located at the intersection of the first line and the second line, i.e., the center of buoyancy is located inside joint 500. In another application, joint 500 is located at a middle height of foil 902. Also note that it is possible to have the center of gravity located close to bulb 908 because the bulbs have different weights, i.e., bulb 908 is heavier than bulb 910. Further, it is possible to have both the center of gravity and the center of buoyancy outside foil 902 because both bulbs are offset from foil 902. In one application, the deflector is small compared to traditional deflectors, i.e., it has a height between 1 and 2 m and a weight of 100 kg or less.

One or more of the exemplary embodiments discussed above are related to deflectors attached to a cable in a marine data acquisition system. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A deflector configured to be attached to a cable towed by a vessel, the deflector comprising:
a foil configured to provide a lift force;
first and second bulbs attached to opposite ends of the foil; and
a joint attached to the foil and configured to receive the cable,
wherein the first and second bulbs are offset by a predetermined distance from a plane that extends through the foil,
at least one of the first and second bulbs has a longitudinal axis that makes a non-zero angle ($\theta$) with a cord of the foil, the cord extending in the plane,
a center of buoyancy of the deflector lays inside the joint, and
the joint comprises an inside part configured to be fixedly attached to the cable and an outside part having a cavity configured to house the inside part,
wherein the outside part rotates relative to the inside part, the inside part has a groove and the outside part has a cam that fits into the groove and moves along the groove.

2. The deflector of claim 1, further comprising:
attachment parts for connecting the first and second bulbs to the foil at the predetermined distance and for increasing a stability of the deflector.

3. The deflector of claim 1, wherein the angle is about 5 degrees.

4. The deflector of claim 1, wherein the foil has a V shape.

5. The deflector of claim 1, wherein a center of mass and the center of buoyancy of the deflector determine a first line, the center of buoyancy and a center of hydrodynamic forces determine a second line, and the first line is substantially perpendicular to the second line.

6. The deflector of claim 5, wherein both the center of mass and the center of buoyancy lay outside the foil and the center of hydrodynamic forces lays inside the foil.

7. The deflector of claim 1, wherein the joint is attached to the foil at a midpoint of a height of the foil.

8. The deflector of claim 1, wherein the inside part has a spherical or cylindrical portion and the groove extends around the spherical or cylindrical portion so that the outside part rotates 360 degrees around a first axis that coincides with a longitudinal axis of the cable.

9. The deflector of claim 8, further comprising:
stoppers for limiting a rotation of the outside part around a second axis, the second axis being perpendicular on the first axis and also on the foil.

10. The deflector of claim 9, wherein the foil cannot rotate around a third axis, that is perpendicular on both the first and second axes.

11. A joint configured to be attached to a deflector for seismic marine exploration, the joint comprising:
an inside part configured to be fixedly attached to a cable; and
an outside part having a cavity configured to house the inside part, the outside part being also configured to rotate relative to the inside part,
wherein the inside part has a groove and the outside part has a cam that fits into the groove and moves along the groove.

12. The joint of claim 11, wherein the inside part has a spherical or cylindrical portion and the groove extends around the spherical or cylindrical portion so that the outside part rotates 360 degrees around a first axis that coincides with a longitudinal axis of the cable.

13. The joint of claim 12, further comprising:
stoppers for limiting a rotation of the outside part around a second axis, the second axis being perpendicular on the first axis.

14. The joint of claim 13, wherein the stoppers are part of the internal part.

15. The joint of claim 11, wherein the external part cannot rotate around a third axis, that is perpendicular on both the first and second axes.

16. A seismic survey system for collecting seismic data, the system comprising:
a vessel;
plural seismic source arrays towed by the vessel and configured to generate seismic waves; and
at least one deflector attached to a corresponding sub-array of a seismic source array and configured to maintain a separation distance between the sub-array and an adjacent sub-array,
the at least one deflector comprising,
a foil configured to provide a lift force,
first and second bulbs attached to opposite ends of the foil, and
a joint attached to the foil and configured to be attached to a cable connected to the sub-array,
wherein the joint includes,
an inside part configured to be fixedly attached to the cable, and
an outside part having a cavity configured to house the inside part,
wherein the inside part has a groove and the outside part has a cam that fits into the groove and moves along the groove.

17. The system of claim 16, wherein the first and second bulbs are offset by a predetermined distance from a plane that extends through the foil, and
at least one of the first and second bulbs has a longitudinal axis that makes an angle ($\theta$) with a cord of the foil, the cord extending in the plane.

18. The system of claim 16, wherein a center of mass and a center of buoyancy of the deflector determine a first line, the center of buoyancy and a center of hydrodynamic forces determine a second line, and the first line is substantially perpendicular to the second line.

* * * * *